US012661604B2

(12) United States Patent
Mogensen et al.

(10) Patent No.: US 12,661,604 B2
(45) Date of Patent: Jun. 23, 2026

(54) METHOD TO IMPROVE LIQUID YIELD FROM HYDROCARBON PRODUCTION SEPARATORS

(71) Applicant: Abu Dhabi National Oil Company, Abu Dhabi (AE)

(72) Inventors: Kristian Mogensen, Abu Dhabi (AE); Nicholas Singh, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 259 days.

(21) Appl. No.: 17/996,177

(22) PCT Filed: Apr. 15, 2020

(86) PCT No.: PCT/IB2020/053537
§ 371 (c)(1),
(2) Date: Oct. 13, 2022

(87) PCT Pub. No.: WO2021/209788
PCT Pub. Date: Oct. 21, 2021

(65) Prior Publication Data
US 2023/0347259 A1 Nov. 2, 2023

(51) Int. Cl.
*B01D 3/42* (2006.01)

(52) U.S. Cl.
CPC ...................................... *B01D 3/42* (2013.01)

(58) Field of Classification Search
CPC ................................... B01D 3/42; C10G 7/12
See application file for complete search history.

(56) References Cited

U.S. PATENT DOCUMENTS

| | | | |
|---|---|---|---|
| 8,805,587 B1 | 8/2014 | Elshafei et al. | |
| 2009/0182693 A1 | 7/2009 | Fulton et al. | |
| 2011/0125687 A1 | 5/2011 | Al-Duwaish et al. | |
| 2019/0055824 A1 | 2/2019 | Babcock et al. | |

FOREIGN PATENT DOCUMENTS

WO 2014015096 A2 1/2014

OTHER PUBLICATIONS

International Search Report and Written Opinion of the International Searching Authority for corresponding International Patent Application No. PCT/IB2020/053537, mailed Jan. 20, 2021.
United Arab Emirates Ministry of Economy Search Report and Office Action Summary for corresponding Application No. P6002106/2022 , issued Apr. 15, 2025.

*Primary Examiner* — Renee Robinson
(74) *Attorney, Agent, or Firm* — Renner, Otto, Boisselle & Sklar, LLP

(57) ABSTRACT

A method of regulating at least one parameter of a separator for use in a hydrocarbon production facility is described. The method comprises receiving at least one first temperature value and/or at least one first pressure value from at least one upstream component, determining a target value for each of the at least one parameter for the separator based on the received at least one first temperature value and/or the at least one first pressure value and regulating the at least one parameter of the separator based on the respective target value. Further, a corresponding apparatus is described.

8 Claims, 6 Drawing Sheets

400

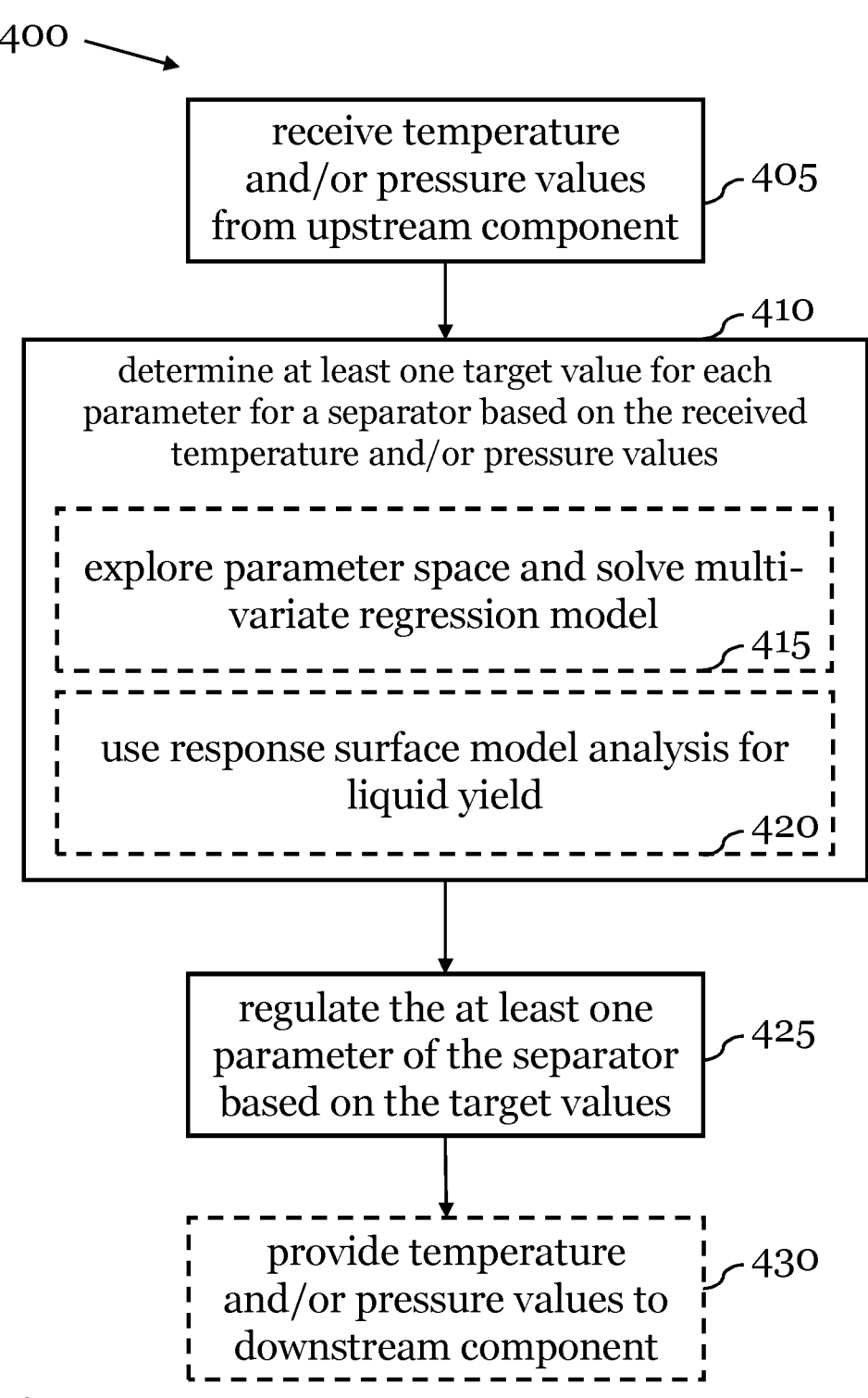

receive temperature
and/or pressure values
from upstream component — 405 determine at least one target value for each
parameter for a separator based on the received
temperature and/or pressure values — 410 explore parameter space and solve multi-
variate regression model — 415 use response surface model analysis for
liquid yield — 420 regulate the at least one
parameter of the separator
based on the target values — 425 provide temperature
and/or pressure values to
downstream component — 430

Fig. 4

METHOD TO IMPROVE LIQUID YIELD FROM HYDROCARBON PRODUCTION SEPARATORS

This application is a national phase of International Application No. PCT/IB2020/053537 filed Apr. 15, 2020, which is hereby incorporated herein by reference in its entirety.

The current application relates to a method to improve the liquid yield from hydrocarbon production facilities. In particular, the method relates to improving the liquid yield obtained from a separator chain having a sequence of separators, which are used to separate different components of hydrocarbons extracted from a hydrocarbon field, in particular gas and crude oil.

For the extraction of hydrocarbon compositions from fields, wells are placed in reservoirs, which are located beneath the ground. A field can consist of several reservoirs. The wells are used for extracting the hydrocarbon composition from the reservoir via a bore. The hydrocarbon composition provided by different wells of the hydrocarbon field is collected at a production manifold. From there, it is supplied to a separator chain. A separator chain, which is sometimes referred to as a separator train, may consist of at least two separators, which are connected in series. A first separator receives the hydrocarbon composition provided by the wells from the production manifold. In the separator, the hydrocarbon composition is separated into gaseous and liquid portions. The liquid portion is provided to a second separator, where again gaseous and liquid portions are separated, however at different operating conditions, for example different pressures and/or temperatures. Each separator forms a separation stage of a multi-stage separation process, in which, at each separation stage, liquid portions and gaseous portions are separated from one another. Since the presence of liquid portions and gaseous portions within the separator depend on the operating conditions of the separator and the composition of the hydrocarbon composition, the amounts of liquid hydrocarbon and gaseous hydrocarbons and therefore the separation efficiency is different for each separator. The liquid portions separated in each stage are provided to the next stage for further separation. At the end of the separation chain, the separated liquid hydrocarbon portion is stored in tanks of an oil storage. In a typical application, the separation process is configured in such a way that the liquid portion provided by the last separation stage is stabilized crude oil.

The gaseous portions separated in each stage are collected at a gas processing facility, where they can be further processed. At the gas processing facility, sales gas and natural gas liquids (NGL) can be obtained from the gas provided by the separator chain. Natural gas liquids are sometimes also referred to as natural gas condensates and are a low-density mixture of hydrocarbon liquids. Because of their low density, they are often part of the gaseous hydrocarbon portion and condensate from the gaseous hydrocarbon portion during further processing in the gas processing facility, e.g. when pressure of the gaseous hydrocarbon portions is reduced.

As such, the separator chain provides the following products: sales gas, NGL, and stabilized crude oil.

As indicated above, the separation efficiency, and in particular the yields of the liquid portion and the gaseous portions, depend on the operation conditions of the separators, including temperature inside the separator and/or pressure inside the separator. First stage pressures may vary from 50-100 psia up to values approaching the reservoir pressure minus the hydrostatic pressure of the fluid column. In cases considered for the current invention, the pressure range is 100-1500 psia. Similarly, the temperature may vary from ambient up to reservoir temperature minus the heat loss from reservoir to surface. In cases considered for this invention, the temperature range is 60-250 F. Since the separator trains are not heat-insulated, temperature is difficult to control and may exhibit seasonal variations, whereas pressures can be adjusted.

According to the state of the art, these operation conditions for each separator of the multi-stage separator chain are selected and set when the separator chain is assembled and is not changed anymore. Thereby, the selection is based on pressure-volume-temperature (PVT) lab studies, expected oil flow rates, which are estimated based on the results of extraction of hydrocarbon compositions from pilot wells in the field, or the selection is simply made based on the need to fulfill technical requirements of the separators, which are used—for example separator inlet requirements or filling targets of tanks and vessels.

Such a selection and setting of the operation conditions has major drawbacks, because it is usually based on an estimation of the field and not based on the feedback received from the actual wells, which are used to extract the hydrocarbon compositions. It can also be said the selection and setting is theoretical and does not relate to the real time situation. Consequently, the separator chain is not operated under optimum operational conditions. Further, even if the operation conditions may be suitable at the time the field is set up, the optimum operational conditions may change, for example based on the amount of hydrocarbon compositions left in the reservoirs or the fluid composition of the hydrocarbon, which will not be constant over the lifetime of the field. Furthermore, changes in the environmental conditions also affect the operational conditions of the separator chain. For example, in most cases, the separators are exposed to temperature changes, for example during nighttime and daytime, as well as seasonal variations, which may cause variations in the temperature inside the separators.

Hence, there is a need in the art to provide methods for improving the operational conditions of a separator chain during the lifetime of a field in order to improve the liquid and gas yields obtained when extracting hydrocarbon compositions from the field.

The above-mentioned need is fulfilled by a method of regulating at least one parameter in a separator for use in a hydrocarbon production facility, for example in a multi-stage separator chain, according to the present invention.

According to the present invention, the method of regulating at least one parameter of a separator for use in a hydrocarbon production facility comprises the step of receiving at least one first temperature value and/or at least one first pressure value from at least one upstream component. The at least one parameter of the separator may be a parameter, which has influence on the operational conditions of the separator. For example, the parameter may be a pressure value of the separator and/or a temperature value of the separator.

As the person skilled in the art will appreciate, temperature and pressure are parameters, which can be used for characterizing the operation of a separator and therefore, these parameters have an impact on the efficiency of said separator. Therefore, the method of regulating the at least one parameter takes into account information about temperature or pressure of the upstream component.

The received at least one first temperature value and/or the at least one first pressure value is from at least one upstream component. The term upstream refers to the flow direction of the hydrocarbon composition from the field to the storage of the products obtained in the hydrocarbon production facility. Hence, a component upstream of a current separator is closer to the field, wherein a component downstream to the current separator is closer to the storage. Thereby, closer is not limited to the special sense, but refers to the order of the components within the production chain. Therefore, an upstream component is a component, which is located upstream relatively to the separator, which is to be regulated. In an example, said separator may receive liquid hydrocarbon from one or more other separators. In this case, the other separator may be the upstream component. A downstream component may also be a separator to which the current separator provides liquid hydrocarbon.

The received at least one first temperature value and/or the at least one first pressure value may be determined by at least one sensor. For example, a sensor may be a part of the upstream component, which may be another separator, or the sensor may itself be referred to as the upstream component. In this case, although the sensor itself is not a part of the hydrocarbon flow path, the sensor is still associated with the other separator, which is upstream to the separator the parameter of which is to be regulated.

Further, the method comprises the steps of determining a target value for each of the at least one parameter for the separator based on the received at least one first temperature value and/or the at least one first pressure value and regulating at least one parameter of the separator based on the respective target value. The target values for the at least one parameter, may be, for example, a target pressure value or a target temperature value. For example, operating pressure of a separator may be controlled by use of one or more pressure-control valves. A pressure-control valve may be a backpressure valve. A pressure controller senses pressure in the separator. Then, the controller can open the pressure-control valve if the pressure is higher than the target pressure value or close the pressure-control valve if the pressure is lower than the target pressure value.

The target value corresponds to a parameter value, which provides an improved operation of the separator. In this context, improved operation refers to an operation, which provides a liquid yield, which is more preferred than the liquid yield achieved by the current operational condition. An improved liquid yield may correspond to a particularly high crude oil yield and may also go along with a high NGL yield, while the gas yield is relatively low. Since crude oil and NGL have high market values, it is preferred to produce high yields of these portions. Hence, the target value may be determined such that the liquid yield of the separator is optimized.

As such, the target value is based on the operational condition, e.g. temperature and/or pressure, of the at least one upstream component and thereby provides for improving the operational condition of the separator based on the operational condition of the at least one upstream component, e.g. one or more other separators.

In this way, it is possible to regulate the liquid yield of a separator during operation of the hydrocarbon production facility. In particular, it may be possible to employ this method of regulating at least one parameter in one or more separators of a separator chain of a hydrocarbon production facility. Thereby, the operational condition of each separator is regulated based on the current operational condition of at least one of the upstream separators.

By regulating the separators based on the other separators, it is possible to improve the efficiency of the overall separator chain and to account for temperature variations and variations of the hydrocarbon composition overtime.

Besides these aspects, it is also possible to account for the effects, which the fluid lines, which are used to guide the hydrocarbon fluid from the wells to the separators, have on the hydrocarbon composition. For example, if the fluid lines are rather long, it is possible that the hydrocarbon composition of the fluid received at the first separator differs from the hydrocarbon composition of the fluid extracted from the wells or the fluid in the production manifold. This may be, for example, because low density portions of the fluid move faster in the fluid lines compared to higher density portions.

In some preferred embodiments, the method may also comprise the steps of receiving liquid hydrocarbon from the at least one upstream component, at least partially separating liquid portions of hydrocarbon from gaseous portions of hydrocarbon, providing separated liquid hydrocarbon to a downstream component, and providing separated gaseous hydrocarbon to a gas processing component. A downstream component may, for example, be another separator, which is connected downstream of the separator. Preferably, the other separator may be connected downstream of a liquid line of the separator.

In some preferred embodiments, the method may also comprise receiving at least one second temperature value and/or at least one second pressure value from at least one downstream component. Further, determining the target value may be based on the received at least one second temperature value and/or the at least one second pressure value from the at least one downstream component.

In some preferred embodiments, the method may also comprise providing at least one temperature value and/or at least one pressure value of the separator to a downstream component. For example, if the separator provides liquid hydrocarbon to a higher stage separator for further separation, the separator may provide the higher stage separator with temperature or pressure information, so that the higher stage separator may itself perform a similar method of regulating the pressure of the higher stage separator.

In some preferred embodiments, the determining of the target value may be based on a multi-variate regression model. The multi-variate regressing model may comprise exploring a parameter space with a fine-gridded search. The parameter space may be defined by maximum values and minimum values of the received at least one first temperature value and/or the at least one first pressure value of the at least one upstream component and possible maximum values and minimum values of the target value of the at least one parameter of the separator. The multi-variate regression model is then solved for a combination of the parameters of the parameter space. Preferably, the model is solved for all possible combinations, in order to obtain the best suitable target value.

In order to improve the determination of the target value even further, it is possible to receive at least one second temperature value and/or at least one second pressure value from at least one downstream component and to define the parameter space also by the maximum values and minimum values of the received at least one second temperature value and/or the at least one second pressure value of the at least one downstream component. Thereby, not only information about the upstream components, but also information about the downstream components is used, which improves the pressure determination of a separator by taking into account information about the entire system, for example the entire multi-stage separator chain.

After solving the multi-variate regression model, a response surface model analysis may be used by expressing the liquid yield of either the separator or the total system as a mathematical function of the temperature and/or pressure values of the separator, of the at least one upstream component, and of the at least one downstream component, if information about the downstream components is available.

Afterwards, it may also be possible to check whether the determined target value indeed represents an improvement by inserting the determined target value into the multi-variate regression model and evaluating the improved conditions compared to the unregulated conditions.

The above-mentioned need is also fulfilled by a separator for use in a hydrocarbon production facility according to the current invention.

The separator may comprise a tank, an inlet to the tank, an outlet of the tank, and a means for separating liquid portions and gaseous portions of hydrocarbons.

The inlet of the separator may be connected to an upstream component, which may be another separator, for example a lower stage separator in a multi-stage separator chain, or a production manifold. From the upstream component, the separator may receive liquid hydrocarbon, which is to be separated in the separator by the means for separating. The means for separating may be configured to separate liquid portions of hydrocarbon from gaseous portions of hydrocarbon.

The separator may be connected to two downstream components, wherein a first downstream component is configured to receive the separated liquid hydrocarbon portions and the second downstream component is configured to receive the separated gaseous hydrocarbon portions. The first downstream component may be another separator, for example a higher stage separator of a multi-stage separator chain, or a storage, for example a crude oil storage. The second downstream component may be a gas processing facility. In the gas processing facility, the separated gaseous hydrocarbon portions are further processed, for example in order to separate gas and NGLs.

According to the current invention, the separator comprises a means for receiving at least one first temperature value and/or at least one first pressure value from at least one upstream component. Further, the separator comprises a means for determining a target value for each of at least one parameter of the separator based on the received at least one temperature value and/or pressure value. Also, the separator comprises a means for regulating the at least one parameter of the separator based on the target value. One or more of these means may be provided by a controller, which is part of the separator. In an example, the controller may be represented by a CPU controller. For example, the controller may control the operating pressure of a separator by use of one or more pressure-control valves. A pressure-control valve may be a backpressure valve. A pressure controller senses pressure in the separator. Then, the controller can open the pressure-control valve if the pressure is higher than the target pressure value or close the pressure-control valve if the pressure is lower than the target pressure value.

In some preferred embodiments, the separator may also comprise a means for providing at least one of a temperature value and/or a pressure value of the separator to at least one downstream component.

In some preferred embodiments, the means for determining the target value may be based on a multi-variate regression model. For this purpose, the means for determining may comprise a means for exploring a parameter space with a fine-gridded search, wherein the parameter space is defined by maximum values and minimum values of the received at least one first temperature value and/or at least one first pressure value of the at least one upstream component and possible maximum and minimum values of the pressure of the separator and a means for solving the model for a combination of the parameters of the parameter space.

Further, the separator may also comprise a means for receiving at least one second temperature value and/or at least one second pressure value from at least one downstream component and the parameter space may be defined by maximum values and minimum values of the received at least one second temperature value and/or the at least one second pressure value of the at least one downstream component.

Also, the means for determining the target value may comprise a means for using a response surface model analysis by expressing the liquid yield of either the separator or the total system as a mathematical function of the temperature and/or pressure values of the separator and the at least one upstream component. If the separator receives temperature or pressure information from at least one downstream component, the mathematical function may also depend on the temperature or pressure values from the at least one downstream component.

The above-mentioned need is also fulfilled by a method of regulating at least one parameter of a separator for use in a hydrocarbon production facility. The hydrocarbon production facility comprises a multi-stage separator chain of N separators connected in series, with N≥2. The at least one parameter of the separator may, for example, be a temperature of the separator and/or a pressure of the separator.

The method comprises the step of performing parameter regulation of at least a j-th separator of the multi-stage separator chain with 1<j≤N, wherein performing parameter regulation comprises the step of receiving at least one first temperature value and/or at least one first pressure value of a (j−1)th separator of the multi-stage separator chain, wherein a liquid line of the (j−1)th separator is connected upstream of an inlet of the j-th separator. Further, the performing the parameter regulation comprises the steps of determining a target value for the j-th separator of the multi-stage separator chain based on the received at least one first temperature value and/or the at least one first pressure value, and regulating at least one parameter of the j-th separator based on the target value.

For example, if the method is operated in a hydrocarbon production facility with a two-stage separator chain of two separators connected in series with their liquid line, the value N is equal to 2. Accordingly, there is only one possible value for j, namely 2 and the parameter regulation comprises the step of receiving at least one first temperature value and/or at least one first pressure value of a first separator of the two-stage separator chain, wherein an output liquid line of the first separator is connected to an input inlet of the second separator. Further, the performing parameter regulation comprises the steps of determining a target value for the second separator of the two-stage separator chain based on the received at least one first temperature value and/or the at least one first pressure value, and regulating at least one parameter of the second separator based on the target value. Or in other words: the parameter in the second separator is regulated based on the temperature or pressure of the first separator.

In case that N≥3, it is possible that at least one of the separators of the separator chain receives temperature and/or pressure values from two or more upstream components. Although in some preferred application each separator of the separator chain only receives the temperature and/or pressure values of the previous separator, the invention is not limited in this way. Instead, it may be possible that each separator receives temperature and/or pressure values from multiple upstream separators.

Additionally, it may also be possible that the separator receives temperature and/or pressure values from one or more upstream components and one or more downstream components. Thereby, it is possible to regulate the separator based on knowledge about the entire separator chain, which may help to reach improved operational conditions more quickly.

In a preferred embodiment, the parameter regulation may be performed for each j of the N–1 separators with $1 < j \leq N$. For example, if the separator chain is a three-stage separator chain, a second separator is regulated based on the temperature and/or pressure values of first separator and a third separator is regulated based on the temperature and/or pressure values of the second separator. For higher order multi-stage separator chains, the chain is set fourth accordingly.

In a further preferred embodiment, the N separators in the multi-stage separator chain are ordered according to the respective value of j and the pressure regulation may be performed for monotonously incrementing values of j. For example, if the separator chain is a three-stage separator chain, the parameter of the second separator is regulated prior to the regulation of the third separator. This provides the advantage that the regulation of the third separator already profits from the regulation, which is made to the second separator. Accordingly, improvements to the overall efficiency of the separator chain can be achieved faster.

In some preferred embodiments, the determining of the target value may be based on a multi-variate regression model. The multi-variate regressing model may comprise exploring a parameter space with a fine-gridded search. The parameter space may be defined by maximum values and minimum values of the received at least one first temperature value and/or the at least one first pressure value of the at least one upstream component and possible maximum values and minimum values of the target parameter of the separator. The multi-variate regression model is then solved for a combination of the parameters of the parameter space. Preferably, the model is solved for all possible combinations, in order to obtain the best suitable target value.

In order to improve the determination of the target value even further, it is possible to also receive at least one of second temperature value and/or at least one second pressure value from at least one downstream component and to define the parameter space also by the maximum values and minimum values of the received at least one second temperature value and/or the at least one second pressure value of the at least one downstream component. Thereby, not only information about the upstream components, but also information about the downstream components is used, which improves the pressure determination of a separator by taking into account information about the entire system, for example the entire multi-stage separator chain.

After solving the multi-variate regression model, a response surface model analysis may be used by expressing the liquid yield of either the separator or the total system as a mathematical function of the temperature and/or pressure values of the separator, the at least one upstream component, and the at least one downstream component, if information about the downstream components is available.

Afterwards, it may also be possible to check whether the determined target value indeed represents an improvement by inserting the determined target value into the multi-variate regression model and evaluating the improved conditions compared to the unregulated conditions.

The above-mentioned need is also fulfilled by a system for separating liquid portions and gaseous portions in a hydrocarbon production facility. The system comprises a multi-stage separator chain with N separators, wherein the liquid lines of separators are connected in series, meaning that a first separator provides a liquid portion of hydrocarbon to a second separator, which provides a liquid portion of hydrocarbon to a third separator and so forth. Each separator is also connected to a gas processing facility to which the respective separator provides gaseous portions of hydrocarbon.

The system comprises a means for parameter regulating of at least one of the N separators. The means for pressure regulating may for example be a centralized controller, which can receive temperature and/or pressure values from at least one separator of the separator chain and is configured to regulate at least one parameter of at least one separator of the separator chain. Each separator may comprise its own sub-controller, which may communicate with the centralized controller. However, the person skilled in the art will appreciate that there are various ways of how and by which entity the control operation can be performed in the system.

The regulating may be performed for at least a j-th separator of the N separators with $1 < j \leq N$. The regulating is performed by receiving at least one first temperature value and/or at least one first pressure value of a (j–1)th separator of the multi-stage separator chain, wherein a liquid line of the (j–1)th separator is connected upstream of an inlet of the j-th separator. Further, a target value for the j-th separator of the multi-stage separator chain is determined based on the received at least one first temperature value and/or the at least one first pressure value, and at least one parameter of the j-th separator is regulated based on the target value.

The following description and the annexed drawings set forth in detail certain illustrative aspects of the apparatuses, the systems, and the methods described above. These aspects are indicative, however, of but a few of the various ways in which the principles of various embodiments can be employed and the described embodiments are intended to include all such aspects and their equivalent.

In the drawings, like reference characters generally refer to the same parts throughout the different drawings. The drawings are not necessarily to scale, emphasis instead generally being placed upon illustrating the principles of the invention.

In the following description, various embodiments of the invention are described with reference to the following drawings, in which:

FIG. 4 shows a block diagram of a method according to an embodiment of the present invention;

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
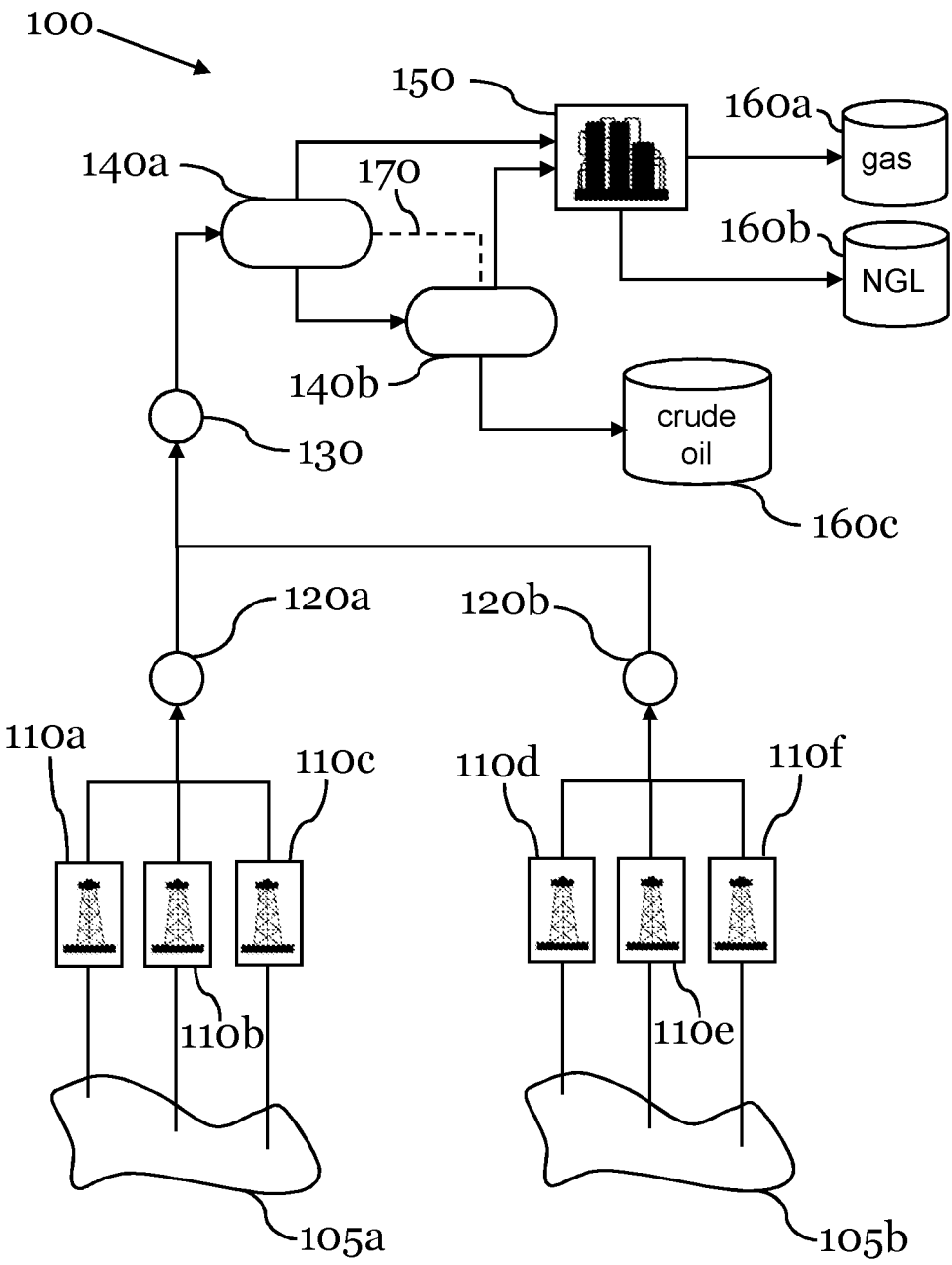
FIG. 1 shows a layout of an exemplary production environment of an exemplary multi-well hydrocarbon field with a separator train of two separators.

FIG. 1 shows a layout of an exemplary hydrocarbon production facility of an exemplary multi-well hydrocarbon field with a multi-stage separator chain comprising two separators.

In the hydrocarbon production facility 100, hydrocarbon is extracted from two hydrocarbon reservoirs 105a, 105b. Wells 110a, 110b, 110c extract hydrocarbon from hydrocarbon reservoir 105a, while wells nod, 110e, 110f extract hydrocarbon from hydrocarbon reservoir 105b. The extracted hydrocarbon is collected at manifolds 120a, 120b.

From manifolds 120a, 120b, the hydrocarbon is supplied to production manifold 130, where it is collected before it is supplied to the separator chain. The person skilled in the art will appreciate that the number of hydrocarbon reservoirs, the number of wells per reservoir and the number of manifolds is for illustrative purposes only. Any number of reservoirs, wells per reservoir and manifolds is possible.

At production manifold 130, a hydrocarbon composition is collected, which is a mixture of hydrocarbon extracted from different reservoirs. Therefore, the composition of the hydrocarbon composition may be inhomogeneous. Therefore, a separation of liquid portions and gaseous portions is necessary. For this purpose, the hydrocarbon composition is supplied to a separator chain, which comprises at least two separators 140a, 140b.

For this purpose, the hydrocarbon composition is supplied from the production manifold 130 to a first separator 140a. The first separator 140a receives the hydrocarbon composition at an inlet to the first separator 140a. At separator 140a, the hydrocarbon composition is separated into a gaseous portion and a liquid portion. The gaseous portions are supplied to gas processing facility 150, where they are further processed in order to produce gas, which is provided to a gas storage 160a, and natural gas liquids (NGL), which are provided to NGL storage 160b.

The liquid portion, which is separated from the gaseous portion by the separator 140a, is supplied to a second separator 140b, which may be referred to as higher stage separator. As such, the first separator 140a comprises an outlet for providing the liquid portion of the hydrocarbon composition to an inlet of the second separator 140b. The second separator 140b operates under different operational conditions. Therefore, the liquid portion provided by the first stage separator 140a may split into gaseous portions and liquid portions, for example caused by a different pressure in the second stage separator 140b. Separator 140b again separates these liquid and gaseous portions. The gaseous portions are again provided to gas processing facility 150, where it is also further processed into gas and NGL, which are provided to gas storage 160a and NGL storage 160b, respectively.

Furthermore, the separator chain comprises a feedback line 170. The feedback line 170 can be used by the separators 140a, 140b to provide the temperature and/or pressure information, which is used for the regulation, to the upstream or downstream stages.

The hydrocarbon production facility 100 comprises two separators, which means that separator 140b is the last separator stage. The separated liquid portion is provided from this last separator 140b to a crude oil storage 160c.

Figure 2:
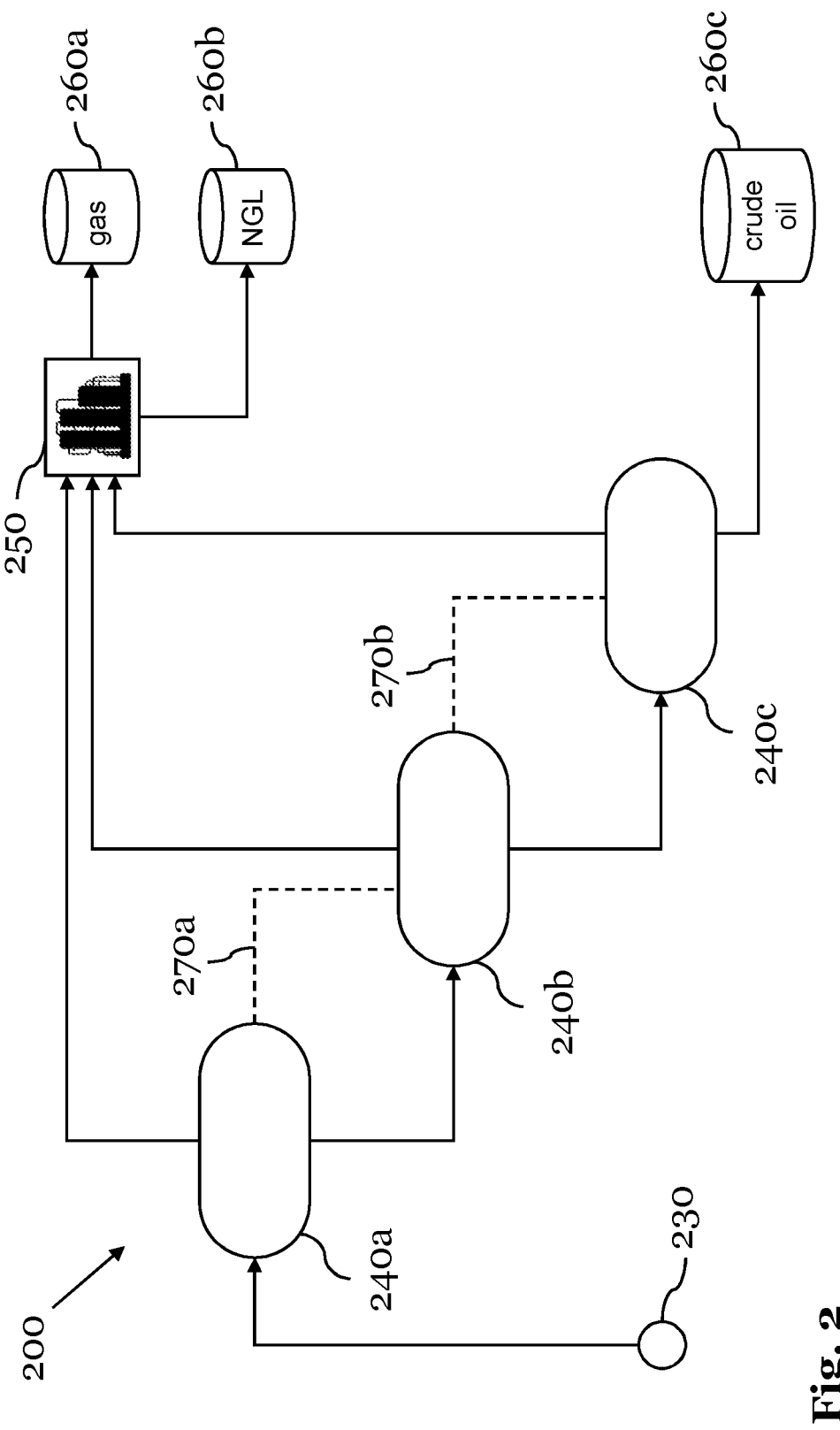
FIG. 2 shows an embodiment example of a separator chain with three separators.

FIG. 2 shows an embodiment example of a separator chains with three separators.

In the hydrocarbon production facility 200, production manifold 230 receives a hydrocarbon composition from reservoirs similar as has been described with respect to hydrocarbon production facility 100 illustrated in FIG. 1. From the production manifold 230, the hydrocarbon composition is supplied to a first separator 240a. First stage separator 240a separates gaseous portions of hydrocarbon from liquid portions of hydrocarbon. The gaseous portions are supplied to gas processing facility 250, where they are further processed to provide gas to gas storage 260a and NGL to NGL storage 260b.

The liquid portion is supplied from the first separator 240a to a second separator 240b, which again separates gaseous portions of hydrocarbon from liquid portions of hydrocarbon. The second separator 240b operates at different operational conditions than the first separator 240a. The gaseous portions are supplied to gas processing facility 250, while the liquid portions are supplied to a third separator 240c.

The third second separator 240c again separates gaseous portions of hydrocarbon from liquid portions of hydrocarbon. The third separator 240c operates at different operational conditions than the first separator 240a and the second separator 240b. The gaseous portions are supplied to gas processing facility 250, while the liquid portions are supplied to a crude oil storage 260c.

Furthermore, the separator chain comprises feedback lines 270a, 270b. The feedback lines 270a, 270b can be used by the separators 240a, 240b, 240c to provide the temperature and/or pressure information, which is used for the regulation, to the upstream or downstream stages. For example, feedback line 270a can be used by the first separator 240a to provide temperature and/or pressure information to the second separator 240b and feedback line 270b can be used by the second separator 240b to provide temperature and/or pressure information to the third separator 240c. Also, the feedback lines 270a, 270b can be used in the upstream direction, for example feedback line 270a can be used by the second separator 240b to provide temperature and/or pressure information to the third separator 240a and feedback line 270b can be used by the third separator 240c to provide temperature and/or pressure information to the second separator 240b. Although not shown in FIG. 2, there may be additional feedback lines, for example a feedback line between the first separator and the third separator, so that it will be possible to provide temperature and/or pressure information to higher or lower separator stages, which are not adjacent to the separator, which provides the temperature and/or pressure information.

The person skilled in the art will appreciate that an arbitrary number of second separators 240b may be connected between the first separator 240a and the third separator 240c. From each second separator 240b, the liquid portion is then supplied to the next second separator 240b, while the last second separator 240b supplies the liquid portion to the third separator 240c.

Figure 3:
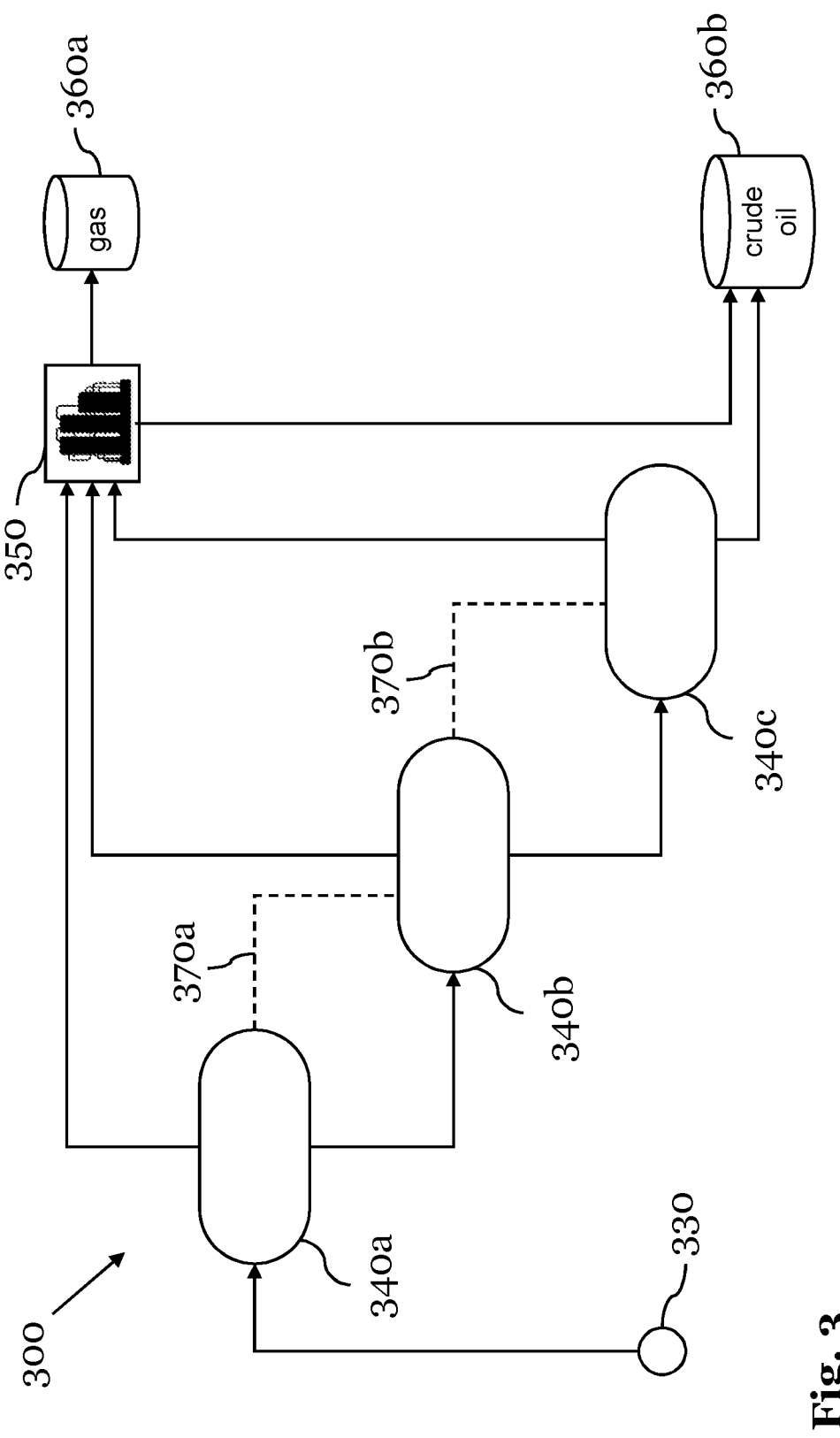
FIG. 3 shows another embodiment example of a separator chain with three separators.

FIG. 3 shows another embodiment example of a separator chain with three separators. The hydrocarbon production facility 300 depicted in FIG. 3 differs from the hydrocarbon production facility 200 illustrated in FIG. 2 in that the liquid portion of hydrocarbon, which is separated from the gaseous portion in the gas processing facility 350, i.e. the NGL portion, is provided to crude oil storage 360b instead of being stored separately in a NGL storage.

Accordingly, the operation of the separators 340a, 340b, 340c corresponds to the separators 240a, 240b, 240c described with respect to FIG. 2.

FIG. 4 shows a block diagram of a method according to an embodiment of the present invention. Method 400 starts at step 405 where temperature and/or pressure values are received from an upstream component. As has been described throughout the description, an upstream component may be a separator or a production manifold.

At 410, the method continues by determining a target value for a parameter of a separator based on the received temperature and/or pressure values. This step may optionally include step 415 of exploring a parameter space and solving a multi-variate regression model as well as step 420 of using response surface model analysis for the liquid yield being expressed as a mathematical formula.

At 425, the method continues by regulating the at least one parameter of the separator based on the determined target values and may continue optionally with step 430 of providing temperature and/or pressure values to a downstream component, which may be another separator, which may receive liquid portions of hydrocarbon form the separator, which has been regulated by method 400.

Figure 5:
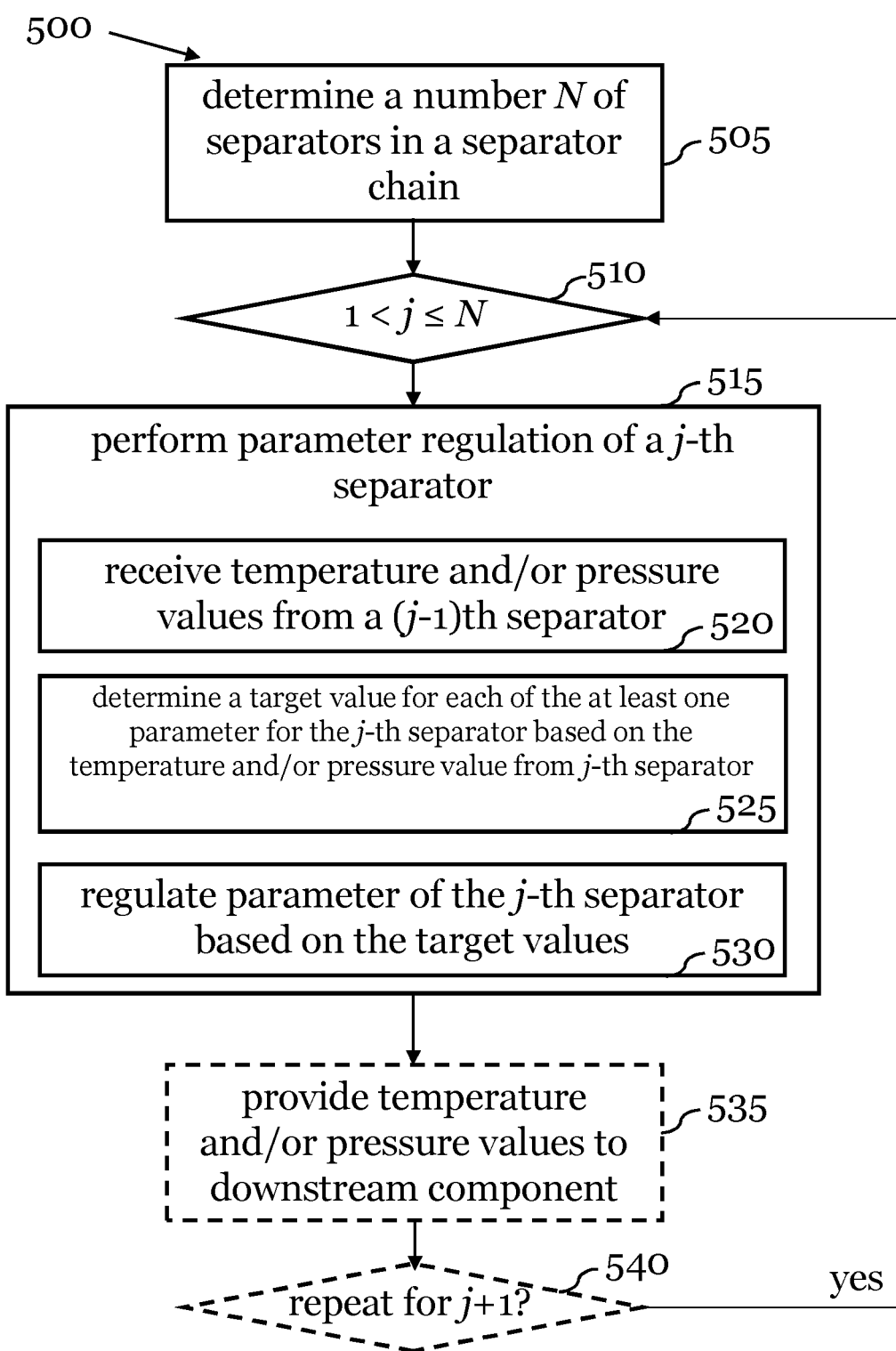
FIG. 5 shows a block diagram of a method according to another embodiment of the present invention.

FIG. 5 shows a block diagram of a method according to another embodiment of the present invention. Method 500 starts at step 505 by determining a number N of separators in a separator chain.

At 510, a number j is selected from $1 < j \leq N$. With the selected number j, parameter regulation is performed 515 for a j-th separator of the separator chain.

Performing 515 parameter regulation comprises step 520 of receiving temperature and/or pressure values from a (j−1)th separator, step 525 of determining a target value for a j-th separator based on the temperature and/or pressure values received from the j-th separator, and step 530 of regulating pressure of the j-th separator based on the target value.

Further, method 500 may comprise the additional step 535 of providing temperature and/or pressure values to a downstream component, which may be another separator.

Further, method 500 may comprise step 540 of evaluating whether pressure regulation is to be performed for another number j with $1 < j \leq N$. If the evaluation results in a desire to perform at least one parameter regulation for another number of j, method 500 continues again at step 510 with selecting another number j. In this manner, all possible numbers j with $1 < j \leq N$ may be selected in order to regulate multiple separators.

Figure 6:
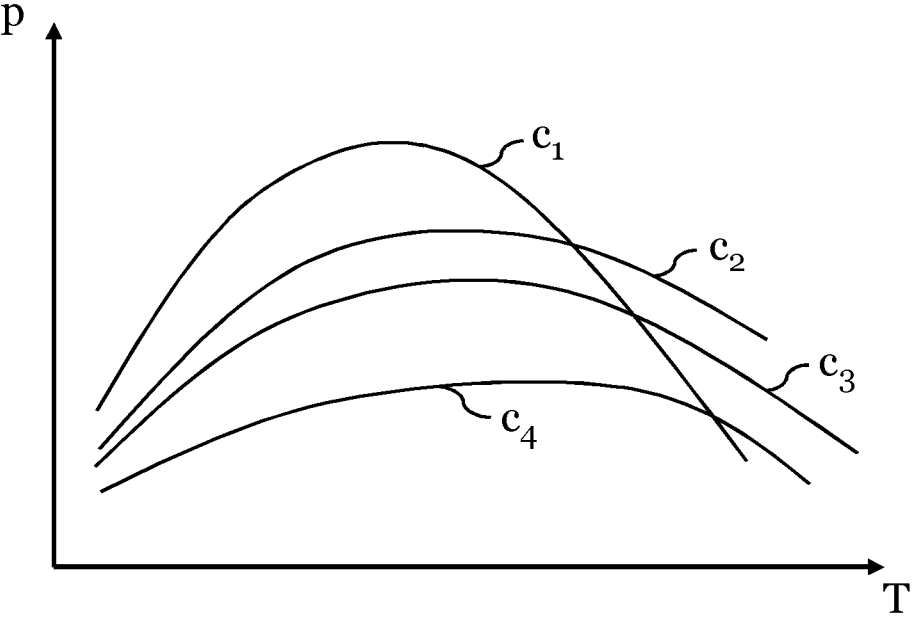
FIG. 6 shows a pressure-temperature diagram of different hydrocarbon compositions.

FIG. 6 shows a pressure-temperature diagram of different hydrocarbon compositions. The pressure-temperature diagram shows four different hydrocarbon compositions $c_1$, $c_2$, $c_3$, $c_4$. The hydrocarbon compositions have different compositions of long-chain and short-chain hydrocarbon molecules. In a simplified way, composition $c_1$ has the highest amount of short-chain hydrocarbon molecules, while composition $c_4$ has the highest amount of long-chain hydrocarbon molecules. As can be seen from the simplified illustration of FIG. 6, each hydrocarbon composition $c_1$, $c_2$, $c_3$, $c_4$ has a different course in the pressure-temperature diagram, which means that the pressure and temperature behavior is different for each hydrocarbon composition. Accordingly, the efficiency of the separation process changes with changes in the hydrocarbon composition. This illustrates the need for regulating the separator conditions in order to provide efficient separation of gaseous and liquid portions.

Figure 7:
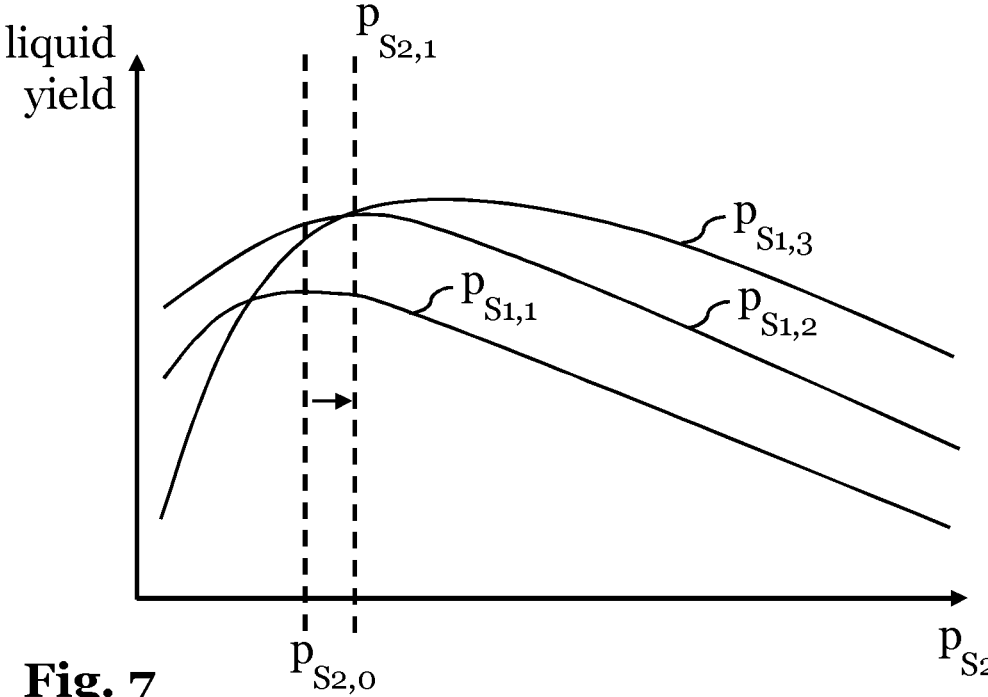
FIG. 7 shows a diagram illustrating the dependency of the liquid yield for different pressure stages of an upstream separator.

FIG. 7 shows a diagram illustrating the dependency of the liquid yield for different pressure stages of an upstream separator.

In FIG. 7, the pressure of the upstream separator, is denoted as pressure of the first separator $p_{S1}$, while the pressure of the downstream separator is denoted as pressure of the second separator $p_{S2}$.

The dependency of the liquid yield obtained by the separation process on the pressure of the second separator is illustrated in FIG. 7. For three different pressure values of the pressure in the first separator $p_{S1,1}$, $p_{S1,2}$, $p_{S1,3}$ the resulting liquid yield is illustrated. As can be seen, the maximum of the liquid yield shifts depending on the pressure of the second separator.

In particular, $p_{S1,1}$ is a lower pressure in the first separator than $p_{S1,2}$, which again is a lower value than $p_{S1,3}$. Further, $p_{S2,0}$ illustrates the setpoint of the pressure of the second separator after initiation of the hydrocarbon production facility. If the pressure in the first separator is similar to $p_{S1,1}$, the liquid yield is the highest. However, if the pressure in the first separator increases, for example caused by increased outside temperatures, the maximum is at a different value of $p_{S2}$. For example, if the pressure of the first separator increases to $p_{S1,2}$, the maximum yield would be at $p_{S2}$, which is higher than $p_{S2,0}$. As such, the pressure of the second separator would need to be adapted to $p_{S2,2}$.

Further, considering the influence of different hydrocarbon compositions on the pressure and temperature behavior, as depicted in FIG. 6, it is clear to the person skilled in the art, that differences in the hydrocarbon compositions may shift the entire curves depicted in FIG. 7 to higher or lower pressures $p_{S2}$, which would also shift the target pressure $p_{S2}$ for the maximum liquid yield.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the scope of the appended claims.

The invention claimed is:

1. A method of regulating at least one parameter of a separator for use in a hydrocarbon production facility, the method comprising:

receiving at least one first temperature value and/or at least one first pressure value from at least one upstream component;

determining a target value for each of the at least one parameter for the separator based on the received at least one first temperature value and/or the at least one first pressure value, wherein determining the at least one target value is based on a multi-variate regression model, wherein the multi-variate regression model comprises:

exploring a parameter space with a gridded search, wherein the parameter space is defined by maximum values and minimum values of the received at least one first temperature value and/or the at least one first pressure value of the at least one upstream component and possible maximum and minimum values of the target value for the at least one parameter of the separator, and solving the multi-variate regression model for all possible combinations of parameters of the parameter space; and wherein the determining the at least one target parameter value comprises:

using a response surface model analysis by expressing liquid yield of either the separator or the hydrocarbon production facility as a mathematical function of the temperature and/or pressure values of the separator, the temperature and/or pressure values of the at least one upstream component, and the temperature and/or pressure values of at least one downstream component, if any; and regulating the at least one parameter of the separator based on the respective target value.

2. The method of claim 1, wherein the at least one parameter is a pressure of the separator and/or the temperature of the separator.

3. The method according to claim 1, further comprising:

receiving at least one second temperature value and/or at least one second pressure value from at least one downstream component; and wherein the determining the target value is also based on the received at least one second temperature value and/or the at least one second pressure value from the at least one downstream component.

4. The method according to claim 1, wherein the separator is for use in a multi-stage separator chain and wherein the at least one upstream component is an upstream separator of a separator stage, which is upstream of the separator.

5. The method according to claim 1, further comprising:

providing a temperature value and/or a pressure value of the separator to at least one downstream component.

6. The method according to claim 5, wherein the at least one downstream component is a downstream separator of a separator stage, which is downstream of the separator.

7. The method according to claim 1, wherein the parameter space is also defined by maximum values and minimum values of at least one second temperature value and/or at least one second pressure value of at least one downstream component.

8. The method of claim 1, further comprising checking effect of the at least one target value by:

inserting the at least one target value into the multi-variate regression model; and comparing regulated conditions using the at least one target value, with unregulated conditions.

* * * * *